Sept. 7, 1965   M. RINDERSPACHER ETAL   3,205,110
METHOD FOR PRODUCING SHAPED MULTI LAYER BODIES
Filed July 5, 1961   2 Sheets-Sheet 1

INVENTORS
Max Rinderspacher
Emil Still
BY
Michael S. Striker

Sept. 7, 1965 M. RINDERSPACHER ETAL 3,205,110
METHOD FOR PRODUCING SHAPED MULTI LAYER BODIES
Filed July 5, 1961 2 Sheets-Sheet 2
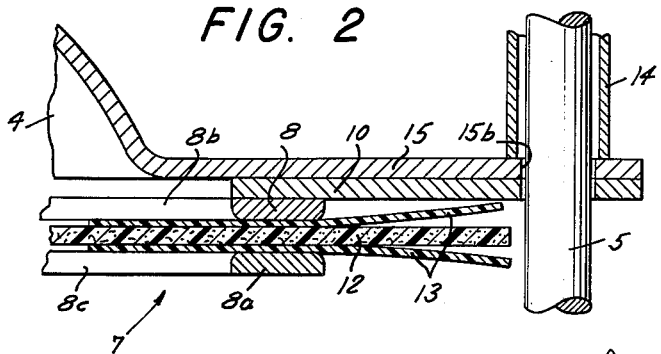
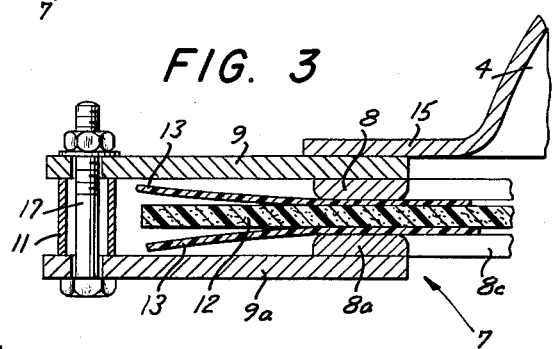
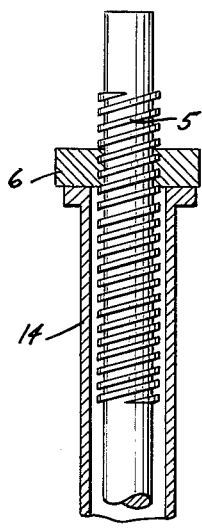
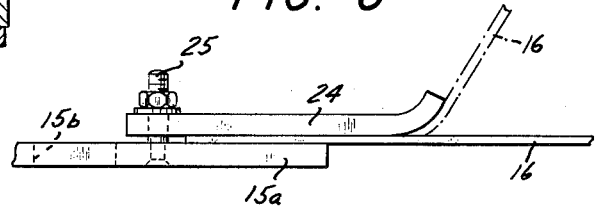
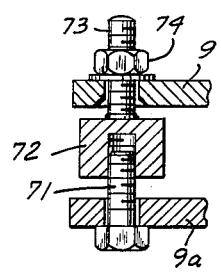
INVENTORS
Max Rinderspacher
Emil Strili
BY Michael S. Striker United States Patent Office 3,205,110
Patented Sept. 7, 1965

3,205,110
METHOD FOR PRODUCING SHAPED MULTI-LAYER BODIES
Max Rinderspacher, Arlesheim, and Emil Stilli, Basel, Switzerland, assignors to Lonza Electric and Chemical Works Ltd., Basel, Switzerland
Filed July 5, 1961, Ser. No. 121,877
Claims priority, application Switzerland, July 8, 1960, 7,890/60
6 Claims. (Cl. 156—222)

The present invention relates to a method and apparatus for producing shaped multi-layer bodies. More particularly, the present invention is concerned with the production of curved multi-layer bodies which, in the nature of a sandwich structure, comprise cover layers of solid thermoplastic synthetic materials and at least one cellular layer of thermoplastic synthetic material interposed between the cover layers. The individual layers of the multi-layer structure are adhesively adhered to each other. According to an important preferred embodiment, the present invention is concerned with the production of shaped bodies which possess either several curved portions which smoothly run into each other without forming a sharp edge, or which possess at least one curved portion which runs into a planar portion without forming a sharp edge therebetween.

Prior art attempts of producing such curved shaped bodies by deep drawing, i.e. by interposing a stack of superposed thermoplastic sheets between a punch member and a corresponding matrix, and deforming the stack of sheets by engaging the same between punch member and matrix did not result in curved sandwich-type bodies wherein the individual layers maintained their original cross-sectional dimensions throughout the entire shaped body. When using such punch member and the corresponding matrix according to the prior art methods, an outer marginal portion of the superposed sheets had to be firmly gripped in a suitable double frame or clamping device. This will cause during deep drawing of the portion of the sandwich structure which is surrounded by the annular gripped portion thereof, the exertion of a minor degree of tensioning on the portions of the superposed sheets which are closely adjacent to the annular holding or gripping device, while the center portion of the deep drawn structure will be subjected to greater tensioning, because this portion comes first into contact with the punch member. Thus, due to the uneven stretching at the concave and convex faces of a deep drawn curved body of this type, and due to the greater degree of tensioning which will be exerted on the center portions of the deep drawn body than on the peripherical portion thereof, the above described methods do not permit the forming of a curved sandwich structure wherein the individual sheet layers will be of uniform cross-sectional dimensions (e.g. thickness) throughout the entire body.

Also when working according to the known pressure process (using a fluid for exerting the pressure to layers) or when working according to the known vacuum process, shaped products with a constant thickness cannot be produced, because the sandwich plate has to be firmly clamped along its edge in the frame of the shaping tools. In this case, a greater stretching and extension occurs in the neighbourhood of the clamping of the edge of the sandwich plate than in the central part of the plate to be curved.

In addition to the difficulties described above further difficulties arise from the fact that the diameter of the curvature at the inner face of a curved body will be smaller than the diameter of the corresponding portion of the outer face of such body. This will result in a very strong stretching of the material in the vicinity of the outer face and thus in a reduction of the cross-sectional dimension of the thermoplastic layers or layer close to the outer face of the curved body portion, whilst, on the other hand, the remainder of the sandwich type body in the vicinity of the corresponding inner face portion will be stretched to a much smaller extent during the shaping so that the moulded body finally formed has a widely varying thickness.

The above difficulties are particularly serious if the layer or layers interposed between the solid cover layers is a cellular layer or are cellular layers, respectively, of substantial thickness, for example more than several millimeters, e.g., up to 25 mm., thus causing more considerable differences between the stretching of the individual parts of the layers. The invention is particularly concerned with this latter case of cellular bodies interposed between solid cover layers.

The above difficulties are encountered irrespective of whether the individual sheets of the sandwich structure have been adhesively adhered to each other prior to deep drawing, or whether the individual sheets are adhesively adhered to each other during the deep drawing process, if during deep drawing a marginal portion of the superposed sheets is firmly gripped in a clamping device.

It is therefore an object of the present invention to overcome the above discussed difficulties and disadvantages.

It is a further object of the present invention to provide a process for the production of laminated moulded bodies of thermoplastic synthetic material which have a cellular body as an intermediate layer or as intermediate layers between solid cover layers in which process the above disadvantages of a different stretching of individual parts of the layers do not occur and the moulded body obtained thus has a practically uniform cross-sectional dimension (e.g. thickness).

The present invention has as a further object to provide an apparatus by means of which the above described result can be achieved.

It is yet another object of the present invention, to provide a method and apparatus for transforming a stack of thermoplastic sheets by deep drawing into a curved unitary shaped body without changing to any appreciable extent the cross-sectional dimensions of the individual sheets, and to produce such curved shaped body in a simple and economical manner.

Other objects and advantages of the present invention will become apparent from a further reading of the description and of the appended claims.

With the above and other objects in view, the present invention comprises in a method of producing a curved shaped unitary body of predetermined configuration. The steps of forming a stack comprising at least two solid thermoplastic cover sheets, and at least one cellular thermoplastic sheet interposed between said cover sheets, with a layer of latently adhesive material interposed between adjacent thermoplastic sheets, the latently adhesive material being adapted to become actively adhesive at the moulding or softening temperature of the thermoplastic sheets, gripping the stack along an annular portion near the outer edge thereof but lightly, so as to hold the sheets of the stack together without preventing sliding movement of the sheets relative to each other under the influence of different degrees of lateral tension exerted on the peripherical portions of the sheets, respectively, and subjecting the portion of the stack surrounded by the gripped peripherical portion to deep drawing to the predetermined configuration of the deformation temperature of the thermoplastic sheets, thereby activating the latently adhesive layer and exerting tension on the gripped peripherical portions of the sheets, respectively, causing lateral sliding movement of the peripherical portions of the sheets, respectively, inwardly toward the portion thereof which is subjected to deep drawing, thereby substantially preventing distortion of the cross section of the dimensions of the sheets during deep drawing of the same. The expression annular portion as used in this specification and the claims means a surface zone distant from the outer edge of the stack of sheets, which zone need not be circular.

According to a preferred embodiment, the method of the present invention contemplates the steps of forming a stack of thermoplastic sheets comprising two solid thermoplastic cover sheets and a cellular thermoplastic sheet interposed between the cover sheets, the sheets being freely movable relative to each other, and layers of latently adhesive material interposed between adjacent thermoplastic sheets, the latently adhesive thermoplastic material being adapted to become actively adhesive at the moulding or softening temperature of the thermoplastic sheets, gripping the stack along an annular portion thereof but lightly, so as to hold the sheets of the stack together without preventing sliding movement of the sheets relative to each other under the influence of different degrees of lateral tension exerted on the annular portions of the sheets, respectively, the gripped annular portion being spaced from the peripheral portion of the stack, subjecting the portion of the stack surrounded by the gripped annular portion to deep drawing to the predetermined configuration at the moulding or softening temperature of the thermoplastic sheets, thereby activating the latently adhesive layer and exerting different degrees of tension on the gripped annular portions of the sheets, respectively, causing different lateral sliding movement of the annular portions of the sheets, respectively, inwardly toward the portion thereof which is subjected to deep drawing and corresponding inward movement of the peripheral portion of the stack into the position initially maintained by the annular portion so that at all times during the deep drawing of the stack of sheets an annular portion thereof will be in the gripped position, the sliding movement being substantially commensurate to the degree of tension exerted on the annular portion of the respective sheet, thereby substantially preventing distortion of the cross section of the dimensions of the sheets during deep drawing of the same, and cooling the thus deep drawn sheets to below their moulding or softening temperature thereby also hardening the thermoplastic adhesive material, whereby a unitary shaped body of the predetermined configuration will be formed.

The present invention is also concerned with an apparatus for deep drawing as a stack of superposed thermoplastic sheets comprising at least two solid cover sheets and at least one cellular sheet interposed between these cover sheets so as to transform the stack into a curved shaped unitary body, said apparatus comprising, in combination, frame means including two juxtaposed frames for gripping therebetween the previously mentioned annular portion of said stack of superposed thermoplastic sheets, adjusting means for adjusting the pressure exerted on the annular portion of the stack of thermoplastic sheets by the juxtaposed annular frames during gripping of the stack of sheets so as to permit sliding lateral movement of individual sheets of the stack of sheets when the individual sheets, respectively, are subjected to tension, and deep drawing means operatively connected with and surrounded by the frame means, the deep drawing means including a punch member adapted to engage a portion of one face of the stack of thermoplastic sheets while an annular portion of the stack surrounding the face portion is gripped by the annular frame means, and matrix means cooperating with the punch member and adapted to engage the other face of the stack at a portion thereof opposite to the portion of the one face, whereby tension will be exerted on the thermoplastic sheet engaged by the punch member and the thermoplastic sheet engaged by the matrix means, respectively, so that gripped portions of the respective thermoplastic sheets will slide into contact with the deep drawing means.

According to a preferred embodiment, the apparatus of the present invention comprises frame means including two juxtaposed annular frames for gripping therebetween an annular portion of a stack of superposed thermoplastic sheets, adjusting means including spacing means for maintaining a predetermined distance between the two juxtaposed annular frames for adjusting the pressure exerted on the annular portion of the stack of thermoplastic sheets by the juxtaposed annular frames during gripping of the stack of sheets so as to permit sliding lateral movement of individual sheets of the stack of sheets when the individual sheets, respectively, are subjected to different degrees of lateral tension, deep drawing means operatively connected with and surrounded by the frame means, the deep drawing means including a curved punch member adapted to engage to portion of one face of the stacks of thermoplastic sheets while an annular portion of the stack surrounding the face portion is gripped by the frame means, and matrix means cooperating with the punch member and adapted to engage the other face of the stack at a portion thereof opposite to the portion of the one face, whereby different degrees of tension will be exerted on the thermoplastic sheets engaged by the punch member and the thermoplastic sheet engaged by the matrix means, respectively, so that gripped portions of the respective thermoplastic sheets will slide into contact with the deep drawing means at different rates commensurate to the degree of tension to which the sheets, respectively, are subjected by operation of the deep drawing means, and heating means for maintaining the stack of thermoplastic sheets during deep drawing at the moulding or softening temperature thereof.

Thus, according to the method of the present invention, curved shaped sandwich bodies can be produced of thermoplastic synthetic sheets, such as cellular thermoplastic synthetic sheet as a core layer and solid thermoplastic synthetic sheets covering the two faces of the core layer, without experiencing the above discussed disadvantages, particularly without uneven stretching of individual portions of individual thermoplastic sheets. As a result, the cross-sectional dimension of the finished curved body produced according to the present invention will be substantially even throughout.

The present invention is based on a method wherein the deep drawing of the superposed sheets which are to be deformed is carried out by engaging the stack of sheets between a punch member and a matrix or counteracting member, and whereby the stack of sheets is gripped between superposed frames so that the center portion of the thermoplastic sheets which is surrounded by the frame will then be available for deep drawing.

The present invention contemplates to produce relatively large shaped bodies such as curved sandwich structures having a length and/or a width of several meters. Preferably, the core layer of the sandwich structure will consist of a closed cell cellular thermoplastic synthetic material.

Particularly, it is intended in accordance with the present invention to produce relatively large structural elements or complete commercial products such as boats, or parts of boats, bath tubs, portions of auto bodies, refrigerator doors, roofs for railroad cars, and the like, and to mass-produce such articles.

Preferably, the thermoplastic material of the cellular layer and of the cover layers will consist of polyvinyl chloride or mixed polymerizates thereof, or of polyethylene or cellulose acetate whereby these synthetic materials may also contain relatively small quantities of softeners and other conventional additives.

According to the present invention, an adhesive material will be interposed between at least two of the thermoplastic sheets which are to be adhered to each other and to be transformed into a curved sandwich structure. The adhesive materials may be interposed as an individual layer, or may be adhered to one of the two adjacent sheets. In any event, the adhesive material will be of a type which may be heat activated, so that when the individual thermoplastic sheets are superposed upon each other, and prior to applying heat thereto, the adhesive material will not be actively adhesive. The superposed sheets which thus are movable relative to each other, are now gripped in the frame of the deep drawing device and thereafter heated to the softening or moulding temperature of the thermoplastic sheet material. The thus heated superposed sheets are then simultaneously deformed by being engaged between the stamping member and a matrix or counteracting tool, and adhered to each other due to activation of the interposed latently adhesive layer which will be of a type which will become actively adhesive when heated to the moulding temperature of the thermoplastic sheet materials. It is, of course, possible that the softening point of the material of the cover layers differs from the softening point of the cellular core layer and, if this should be the case, then heating of the superposed layers must be carried out to the moulding temperature of the layer having the highest softening point.

It is an essential and preferred feature of the present invention that the gripping pressure which is exerted by the frame against the superposed thermoplastic sheets is adjustable and will be adjusted at such a low pressure level that the individual layers may carry out a sliding lateral movement relative to each other in response to the different degrees of pressure to which the individual layers are exposed during the deep drawing process, so that different lengths of the individual layers will be drawn from the gripping frame towards the center of the portion of the stack of thermoplastic sheets which is exposed to deep drawing. Since it is important that at least a portion of each sheet will remain gripped by the frame, it will be necessary either to provide frames having a width which exceeds the maximum distance for which sheets might slide laterally towards the portion of the stack which is subjected to deep drawing or, the gripping frame will grip an annular portion of the stack of sheets which is spaced from the peripheral portion of the sheets, so that at the beginning of the deep drawing process an annular peripheral portion of the thermoplastic sheets will be located outside of the gripping frame. When during deep drawing of the stack of sheets individual sheets will then slidingly move towards the center of the device, such outer peripheral portion of the respective sheets will move inwardly into the gripping area between the superposed frames. In either case, it must be avoided that the outer edge of any one of the superposed thermoplastic sheets will pass inwardly through the gripping frame arrangement so as to loose contact with the same. In other words, throughout the entire process, a sufficient width of the stack of superposed sheets must be gripped by the frame arrangement provided for this purpose. The stack of thermoplastic sheets will be so cut originally that it includes sufficient material for allowing the required degree of lateral sliding movements through the gripping frame towards the area of deep drawing. This excess material may initially be placed in contact with the gripping frame—provided that the gripping frame is of sufficient width, or, preferably, the gripping frame will be only of such width as is required for exerting the desired gripping action and, in such case, the excess material initially will be located outside of the gripping frame.

After deep drawing the superposed thermoplastic sheets and simultaneously adhering the sheets to each other at a temperature corresponding to the moulding temperature of the sheet having the highest softening point, the thus formed shaped body may then be cooled, preferably after being removed from the heated portion of the deep drawing arrangement and such cooling may be carried out by spraying with water or in any other conventional manner.

The outer rim of the thus produced shaped body, corresponding substantially to the portion of the superposed sheets which at the end of the deep drawing process will remain gripped by the frame, is then cut off in order to arrive at the final shape of the deep drawn body. Generally, it will be desirable to carry out the deep drawing to a somewhat greater depth than finally desired, in order to be able to cut off the excess material so as to form the rim of the deep drawn body exactly as desired.

Due to the fact that the low pressure gripping according to the present invention permits lateral sliding movement of the individual sheets of the stack of thermoplastic sheets during the deep drawing of the same, it is possible to obtain as a final product, a body of substantially even thickness throughout, i.e. a body wherein each of the individual layers of the sandwich structure will be of substantially even thickness or substantially even cross-sectional dimensions throughout, and such cross-sectional dimensions will correspond to those of the thermoplastic sheets, from which the body haas been formed by deep drawing. Furthermore, in the manner described above, an even and firm adherence of the individual layers of the sandwich structure is achieved by the heat activation of the interposed adhesive layers which is accomplished by heating the superposed thermoplastic sheets to their moulding temperature.

The interposed adhesive layers are preferably formed of adhesive material which at the elevated deep drawing temperature, i.e. at a temperature within the range of the softening temperatures of the individual thermoplastic sheets, will assure easy sliding of the individual sheets relative to each other. Preferably, thermoplastic adhesive materials free of solvents are used, for instance, adhesive materials based on mixed polymerizates of vinyl chloride and vinyl acetate. The thermoplastic adhesive material may also be applied to a face of one of two adjacent thermoplastic sheets, or, a film formed of the thermoplastic adhesive may be interposed between adjacent sheets. It is also possible to use instead of thermoplastic adhesive materials, thermosetting compounds, for instance, polyester resins, provided that the pot living time of such thermosetting adhesives at least equals the time required for deformation of the stack of thermoplastic sheets by deep drawing of the same.

The apparatus of the present invention comprises a deep drawing arrangement such as coacting punch member and matrix which are movable relative to each other, and a double frame gripping device having two superposed annular frames which can be moved in the same direction as the deep drawing members. As described above, it is essential, according to the present invention that the pressure which is exerted by the double frame gripping device against the interposed stack of thermoplastic sheets will be of such small magnitude that the individual thermoplastic sheets will be capable of sliding movements relative to each other corresponding to the degree of tension to which the individual sheets are subjected during deep drawing of the same. This is accomplished according to the present invention by interposing between carrier members of the two frames which control the distance of the two frames from each other, spacing means such as exchangeable spacing members or adjustable stop devices which prevent the two frames from approaching each other beyond a predetermined minimum distance. This minimum distance of the gripping faces of the two superposed frames, according to the present invention preferably will be between 2 and 10%, and most preferably between 3 and 5% smaller than the thickness of the stack of thermoplastic sheets which is to be gripped between the frames.

In order to permit adjustment of the distance between the frames corresponding to the thickness of the stack of thermoplastic sheets and corresponding to the desired degree of a gripping pressure, spacing members are provided which are exchangeable against spacing members of different length, or the frame arrangement includes adjustable stop means which may be adjusted to the desired distance between the gripping faces of the two frames.

It is an important advantage of the method of the present invention that the deformation of the stack of thermoplastic sheets and the adhesive adherence of the individual thermoplastic sheets so as to form unitary body therefrom can be carried out in a single working step, i.e. during the deep drawing, for instance by moving the punch members towards the matrix or counteracting member. After the deep drawing has been completed by engaging the stack of thermoplastic sheets between the coacting members of the deep drawing device, the thus formed deep drawn structure may be retained in such engagement until the adhesive bond formed between the individual deep drawn sheets by activation of the interposed adhesive material has achieved a sufficient strength. Heating may be continued during the time the stack of thermoplastic sheets is retained in engagement with the deep drawing tool.

The cooperating members of the deep drawing tool such as the punch member and the matrix, may be formed of metal or of other suitable materials, for instance of glass fiber reinforced polyester resin.

The novel features which are considered as characteristic for the invention are set forth in particular in the appended claims. The invention itseslf, however, both as to its construction and its method of operation, together with additional objects and advantages thereof, will be best understood from the following description of specific embodiments when read in connection with the accompanying drawings, in which:

FIG. 2 is a fragmentary cross sectional view taken along line II—II of FIG. 4 but on an enlarged scale, wherein the matrix is shown in operative position;

FIG. 3 is a cross sectional elevational view on an enlarged scale taken along line III—III of FIG. 4;

FIG. 5 is a fragmentary elevational cross sectional view of a portion of the device illustrated in FIG. 2;

FIG. 6 is a fragmentary elevational view of a device which may replace the matrix of FIGS. 1–3; and FIG. 7 illustrates an adjustable stop arrangement for maintaining a desired distance between the two frames which may replace the spacing member arrangement of FIG. 3.

Figure 1:
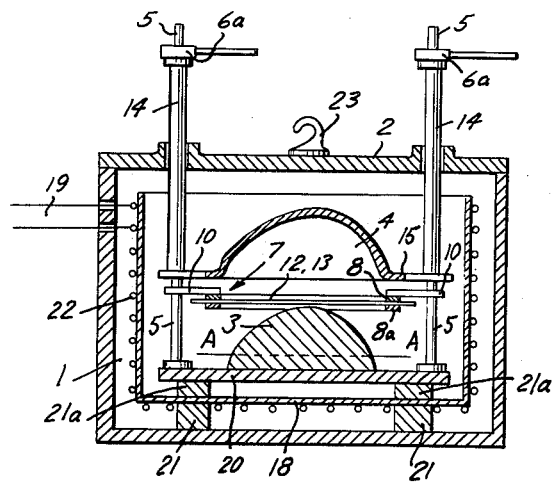
FIG. 1 is a schematic elevational cross sectional view of an entire device according to the present invention with the matrix of the deep drawing device shown upward of its operating position. The cross sectional view of FIG. 1 is taken along the line I—I of FIG. 4.

Referring now to the drawing, and particularly to FIG. 1, it will be seen that the deep drawing device is arranged in a heat insulated box 1 having a removable lid 2. Lid 2 preferably also consists of a heat insulating material and is provided with hook 23 for easier removal of lid 2. A metal insert 18 is located within box 1 and may consist for instance of aluminum. Metal insert 18 serves as a source of radiant heat and as carrier for heating elements 22. Supporting members 21 support the metal insert 18. Electric conduits 19 serve for supplying current to heating elements 22. Preferably one or more fans are arranged within box 1 in order to evenly distribute the hot air produced by the heating arrangement of insert 18 and heating elements 22. However, for clarity's sake, the fans have been omitted from the drawing.

Within insert 18, a mounting plate 20 is provided located on support 21a. The lower portion of the deep drawing tool as illustrated by the punch member 3, is carried by mounting plate 20.

Furthermore four upright lifting screws 5 are fixed to the four corners of mounting plate 20. In FIG. 1, only the two frontal lifting screws 5 are visible, the rearward lifting screws 5 being located directly behind the same.

Lifting screws 5 serve for guiding plate 15 in upward and downward directions. Plate 15 is formed with guide holes 15b and carries the matrix 4 of the deep drawing arrangement. Plate 15 may be integral with matrix 4. Furthermore, lifting screws 5 serve as guides for the gripping frame arrangement schematically shown in FIG. 1 and indicated by reference numeral 7, which serves for holding the superposed thermoplastic sheets which are to be deep drawn. As illustrated, the stack of the superposed thermoplastic sheets comprises a cellular core layer 12 and two opposite cover layers 13.

As shown in FIGS. 1, 2 and 5, the lifting screw arrangement 5 comprises tubular members 14 which rest on or are fixed to mounting plate 15, each of which telescopically embraces the actual lifting screw 5. Tubular members 14 together with lifting screw 5 penetrate upwardly through cover 2. A nut 6 is arranged engaging the upper threaded end of each of lifting screws 5, respectively, and resting at the upper end of the corresponding tubular member 14. Nut 6 may be turned by means of key 6a.

Figure 4:
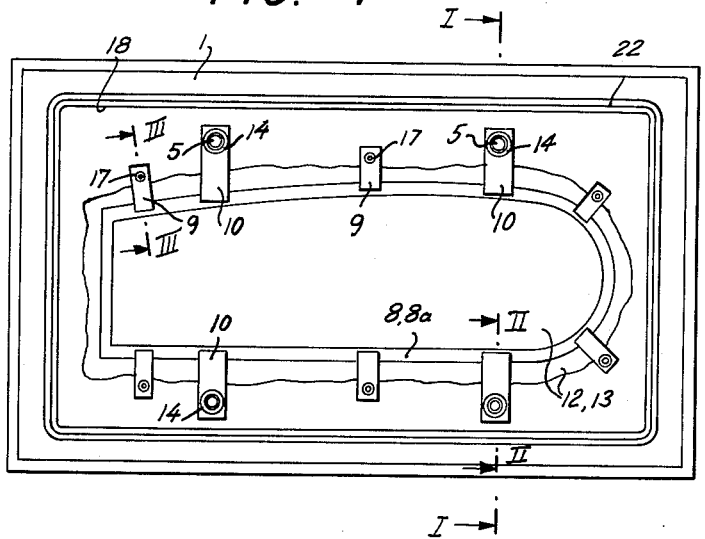
FIG. 4 is a top view of the entire deep drawing device according to the present invention with the cover and matrix removed therefrom.

As shown in FIG. 2, the holding or frame arrangement 7 for gripping the thermoplastic sheets, is carried by four side bars 10 which at their outer ends are movably guided by lifting screw arrangement 5. At their lower faces, side bars 10 are fixed to annular frame 8, as also shown in FIG. 4. The firm connection between side bars 10 and frame 8 may for instance be accomplished by welding. Annular frame 8 circumscribes an opening 8b which is somewhat larger than the opening of the matrix in the plane of member 15.

As can be seen in FIGS. 3 and 4, portions of upper frame 8 located intermediate side bars 10, are firmly connected with upper clamping jaws 9. Upper clamping jaws 9 carry lower clamping jaws 9a by means of an interposed arrangement of a plurality of threaded bolts 17 and cooperating nuts. Lower clamping jaws 9a extend parallel and juxtaposed to upper clamping jaws 9.

Lower clamping jaws 9a carry a lower frame 8a of similar configuration and juxtaposed to upper frame 8. Lower frame 8a is firmly connected to lower clamping jaws 9a, for instance by welding. The central opening 8c of lower frame 8a is of the same configuration as central opening 8b of upper frame 8.

The stack of thermoplastic sheets which, as illustrated for instance in FIGS. 2 and 3, may comprise two solid cover layers 13 each having a thickness of about 1.5 mm., and an interposed cellular core layer or sheet 12 having a thickness of about 10 mm., are gripped between the gripping faces of frames 8 and 8a. As clearly shown, the annular portion of the stack of thermoplastic sheets which is gripped by the frames 8 and 8a, is spaced from the outer end of the stack. In other words, a considerable length of the thermoplastic sheets extends outwardly of the gripping frame arrangement 8–8a. The outwardly extending portion of the superposed thermoplastic sheets represents a reserve portion which may slide inwardly through the gripping arrangement 8–8a into the area defined by the central openings 8b and 8c when during deep drawing of the stack of sheets tension is exerted on the individual thermoplastic sheets.

In order to assure that even under a relatively slight degree of such tension, the thermoplastic sheets all together will be capable of sliding towards the central opening and the individual thermoplastic sheets will be capable of moving laterally relative to adjacent thermoplastic sheets, it is essential that the gripping pressure exerted by frames 8 and 8a is limited. In order to limit the gripping pressure of frames 8 and 8a, spacing or pressure controlling means are provided which, according to FIG. 3, include tubular spacers 11 of predetermined height. Spacer 11 is removably arranged surrounding screw bolt 17. The opposite ends of tubular spacers 11 contact the inner faces of clamping jaws 9 and 9a, and thus, the length of spacer tube 11 will be the minimum distance which will be maintained between clamping jaws 9 and 9a. This distance, in turn, controls the distance between the facing gripping portions of frames 8 and 8a. A series of tubular spacers 11 may be provided, each of different height, and since the tubular spacer 11 is removably arranged, it is relatively simple to insert for any given production run the tubular spacer 11 which possesses the required height. If as indicated by way of example above, the sum total of the thickness of the three thermoplastic sheets amounts to 13 mm., then, for instance, the length of spacer 11 may be such that the distance between the gripping faces of frames 8 and 8a will be about 12.5 mm., i.e. so that the stack of thermoplastic sheets will be compressed to an extent equal to about 4% of the total thickness of the stack.

Such relatively slight compression of thermoplastic sheets 12 and 13 will assure that the gripping force exerted by frames 8 and 8a against the stack of thermoplastic sheets will be relatively small so that the stack of thermoplastic sheets will only be loosely held between frames 8 and 8a and individual thermoplastic sheets will be capable of lateral sliding towards the area defined by openings 8b and 8c if relatively small tensions are exerted on the respective thermoplastic sheets during deep drawing of the portion thereof which is located between openings 8 and 8a.

It is, of course, also possible to replace tubular spacers 11 with other suitable spacing means, for instance, the adjustable stop arrangement 71–72 which is illustrated in FIG. 7. According to this embodiment a screw bolt 71 passing through a bore of the clamping jaw 9a is screwed into a threaded bore in the lower portion of the member 72, the upper face of which is integrally connected with the screw bolt 73. The clamping jaw is pressed against the upper face of member 72 by the nut 74 while the distance of the lower face of member 72 from the upper face of clamping jaw 9a is adjusted to a predetermined size by screwing screw bolt 71 more or less into the bore of member 72.

For purposes of clarity only matrix 4 is shown in FIG. 1 in a somewhat elevated position, although, actually, in operating condition, matrix 4 will rest on side bars 10, as indicated in FIG. 2. Thermoplastic sheets 12 and 13 are gripped between frames 8 and 8a of the gripping device broadly indicated by reference numeral 7, and contact punch member 3. However, it is, of course, also possible to make matrix 4 stationary and punch member 3 the movable deep drawing tool.

According to the embodiment illustrated in FIGS. 1–3, a matrix is provided having an interior cavity corresponding to the shape of punch member 3. By operating with this combination of matrix and punch member, it is, of course, possible, in accordance with the present invention to produce multi-curved shaped bodies which merge into each other without sharp edges or breaks. The curvatures seen in the direction toward the matrix may be concave or convex, provided that the facing surface of punch member and matrix are of corresponding configuration and made of rigid material.

However, when it is desired, to produce a shaped body of only a single concave curvature, somewhat corresponding to that of matrix 4, then it is not necessary to provide as counteracting tool for the punch member a rigid matrix such as matrix 4 of for instance FIG. 1. In the latter case, rigid matrix 4 may be replaced by a resilient membrane which will accept the shape of the punch member 3 when pressed against the same. This is illustrated in FIG. 6, wherein instead of base plate 15 a base frame 15a is provided, defining a central opening, which is of equal size or greater than the central opening of frames 8 and 8a. Base frame 15a is formed with bores 15b for guiding base plate 15a upwardly and downwardly along lifting screws 5. A gripping frame 24 is arranged cooperating with base frame 15a by means of screw connection 25. Frame member 24 extends somewhat further into the central opening, and has an inner end which is rounded and bent upwardly. The outer rim of a resilient membrane 16, for instance a rubber sheet is gripped between members 15a and 24. In initial position, resilient sheet 16 will extend in a plane as indicated in full lines. However, after pressure contact between resilient member 16 and punch member 3, resilient member 16 will conform to the surface configuration of punch member 3 and will be positioned as indicated in broken lines. Thus, according to FIG. 6, the counteracting tool or member which cooperates with the punch member 3 in the deep drawing of the stack of thermoplastic sheets is formed of element 16, 15a, 24, and 25 and will be guided along lifting screws 5 in the same manner as shown in FIG. 1 with respect to matrix 4 and base plate 15. The tubular members 14 which according to FIG. 1 are supported by base plate 15, will be supported, according to FIG. 6 by frame 15a, and tubular members 14 can be pressed downwardly by a turning of nuts 6 on lifting screws 5.

The method of the present invention will be carried out in an apparatus such as described above, in the following manner:

Punch member 3 and matrix 4 or the counteracting tool according to FIG. 6 are heated in heating or heat insulating box 1 to the moulding or softening temperature of the thermoplastic sheets, prior to introduction of the thermoplastic sheets, also the gripping device 7 can be heated at the same time, although this is not a necessity. Matrix 4 or the counteracting tool, and in case of necessity the gripping device 7 are then lifted from the heat insulating box 1, of course, after removal of the cover 2 thereof. Clamping jaws 9a are separated together with lower frame 8a from the other portion of the gripping device 7. This is accomplished by unscrewing bolts 17 and the corresponding nuts. Thereafter, the stack of thermoplastic sheets 13, 12, 13 is positioned on frame 8a in such a manner that the peripheral portion of the stack of thermoplastic sheets will extend outwardly of the outer edge of frame 8a, as illustrated in FIGS. 2 and 3. In other words, thermoplastic sheets 12 and 13 are cut to such size that there will be a sufficient reserve of material outside of gripping frame device 8–8a to supply the length required for inwardly sliding movement of the respective sheets in such a manner that there will be sufficient sheet material left in contact with the gripping frame arrangement for holding the stack of sheets.

Prior to insertion of the sheets 13 a liquid thermoplastic adhesive material is applied to the inner faces thereof, and is allowed to dry thereon so that the inner faces of the two cover sheets 13 will now be coated with a latently adhesive layer adapted to become actively adhesive by being heated to the moulding and softening temperature of the thermoplastic sheets. Thus, upon positioning of the stack of thermoplastic sheets between frames 8 and 8a, the individual thermoplastic sheets will be in contact with each other without being adhesively adhered to each other. After placing the stack of thermoplastic sheets on lower frame 8a, upper frame 8 is superposed and a gripping connection is established by reducing the distance between the clamping jaws 9 and 9a, i.e. by downward turning of the screw connected with bolt 17. Clamping jaws 9 and 9a will be moved toward each other until further movement is prevented by the resistance of tubular spacing member 11. The height of tubular spacing member 11 is so chosen that at this distance between the clamping jaws, the distance between the gripping faces of frames 8 and 8a will be the desired distance, i.e. between about 2 and 10% less than the thickness of the stack of thermoplastic sheets 13, 12, 13.

After thus completing positioning of the stack of thermoplastic sheets in the holding or gripping device 7, the entire gripping device is guided downwardly along lifting screws 5, into box 1, until the stack of thermoplastic sheets will contact punch member 3. Thereafter, either the matrix arrangement 4, or the counteracting tool arrangement of FIG. 6, i.e. the arrangement including the resilient rubber sheet or the like are put into position as indicated in FIG. 1, i.e. is guided downwardly along lifting screws 5, whereby base plate 15 or frame plate 15a will then be supported by side plates 10 and gripping device 7 holding the stack of thermoplastic sheets will be pressed against punch member 3 by the weight of matrix 4 or the counteracting tool arrangement. Thereafter, tubular members 14 are put into position and the heat insulating box 1 which in the meantime has been heated by the heating arrangement indicated by reference numerals 18, 19, and 22, is closed by guiding cover 2 downwardly along lifting screws 5. Introduction of the arrangement indicated by reference numerals 7, 4, 15 or 15a into box 1 and closing box 1 with cover 2 can be carried out with suitable automatic lifting means which may be removably connected to these arrangements or to hook 23.

After thus closing box 1 heating is continued until thermoplastic layers 12 and 13 have reached the desired moulding or softening temperatures. Once the stack of plastic sheets has been heated to the desired moulding or softening temperature, the actual deep drawing is carried out as follows:

The nuts 6 are turned downwardly on lifting screws 5 by means of wrench 6a and thereby will press the tubular member 14 against base plate 15 of matrix 4 (as shown in FIGS. 1–3) or against member 15a in an arrangement as illustrated in FIG. 6. Thereby it is accomplished that the thermoplastic sheets 12 and 13 are engaged between punch member 3 and the inner face of matrix 4, as shown in FIGS. 1–3, or are pressed by punch member 3 against resilient membrane 16, while simultaneously resilient membrane 16 will arch under the pressure of punch member 3. Thus, when the matrix is replaced by resilient member 16, as illustrated in FIG. 6, immediately at the beginning of the deep drawing a compression of superposed thermoplastic sheets 12 and 13 will take place against the resilient force of rubber sheet 16, which pressure will increase until rubber sheet or the like 16 has reached the position indicated in broken lines. When this position has been reached, then one of the cover sheets 13 will be in contact with the lower arched face of rubber sheet 16 and the opposite cover sheet 13 will be engaged by the punch member 3 (not shown in FIG. 6). The stack of thermoplastic sheets will thus be in engagement with punch member 3 to below the line A—A of FIG. 1.

In accordance with the process and apparatus illustrated in FIGS. 1–3, compression of the thermoplastic sheets 12 and 13 will take place only when deformation of the sheets is substantially completed, i.e. when matrix 4 and punch member 3 are in the final deep drawing position with the thermoplastic layers fully engaging the inner face of matrix 4 and being pressed against the same by punch member 3. At this point, the lower rim of matrix 4 and plate 15 will be located below the line A—A of FIG. 1.

Irrespective of whether the process illustrated in FIGS. 1–3, or the process illustrated in FIG. 6 is used, in both cases, during the deep drawing of the superposed thermoplastic sheets 12 and 13, the individual sheets will slide laterally between frame 8 and 8a towards the center of the apparatus. Thus, the major portion of the material or of the additional area of sheet material which is required for the arching transformation will be supplied from the reserve portion of the sheet material which initially was extending outwardly of the gripping frame portions 8 and 8a. Due to the relatively small gripping pressure which is exerted by frames 8 and 8a on the gripped stack of thermoplastic sheets, it is possible that the individual sheets will slide inwardly so that the sheet portions which are subjected to deep drawing will be exposed only to a very slight degree of stretching and will maintain substantially their original thickness.

When the deep drawing has been completed, only the peripheral rim portion of the superposed thermoplastic sheets will still be located in gripping contact with frames 8 and 8a.

At this point, i.e. when deep drawing has been carried out so that the desired final shape of the superposed thermoplastic sheets has been achieved, the thus deformed superposed sheets are maintained in contact with the deep drawing tools until the interposed adhesive has been activated to the desired degree. During this resting period, the deformed sheets are maintained at their moulding temperature. If a thermoplastic adhesive has been applied, then this resting period will last for a time sufficiently long to permit softening of the thermoplastic adhesive to such an extent as to make it actively adhesive, so that upon subsequent cooling the then again hardened adhesive will firmly adhere the adjacent thermoplastic layers to each other. If in place of a thermoplastic adhesive a thermosetting adhesive is used, then the final hardening of the adhesive will take place during the resting period described above.

Thereafter, cover 2 and matrix 4 or counteracting tool 6, as well as gripping device 7 and punch member 3 with support plate 20, while kept connected by nuts 6, will be lifted out of box 1 along tubular members 14 and lifting screws 5, whereby again automatic or mechanical lifting devices may be used.

The previously formed shaped sandwiched body which is still engaged by punch member 3 and either matrix 4 or counteracting tool, i.e. rubber sheet 16, is then cooled for example by spraying with water or any other adequate means. After the sandwich body has been cooled sufficiently below the moulding temperature of the thermoplastic sheets, nuts 6 are screwed off lifting screws 5 and tubular members 14 are removed so that then matrix 4 or counteracting tool 16 may be withdrawn from the interposed shaped thermoplastic multilayer body formed of thermoplastic sheets 12, 13, 12 which are now firmly adhered to each other. Thereafter, the thus produced thermoplastic body while still held in holding device 7, i.e. by the gripping portions of frames 8 and 8a, is separated from punch member 3. Then, lower clamping jaws 9a are separated from upper clamping jaws 9 by loosening of screws 17 and the multi-layer shaped thermoplastic body is separated from holding arrangement 7.

Generally, it will now be desirable to cut off the outer rim of the thus produced shaped multi-layer body since the exact desired shape will be the shape of that portion of the thus produced multi-layer body which at the termination of the deep drawing will be located above line A—A of FIG. 1. Deep drawing originally has been continued so as to shape a body having a rim portion extending below line A—A only for the purpose of obtaining an edge of desired configuration by cutting off the excess rim portion which during deep drawing was located below the line A—A as well as cutting off thereby the portion of the superposed thermoplastic sheets which at the termination of the deep drawing process was still gripped by the superposed frame arrangement 8–8a.

The present invention is not concerned with the specific lifting and pressing devices which are used for positioning the various elements in box 1 or for withdrawing the same therefrom, or which are used for pressing punch members 3 against matrix 4. A great variety of conventional mechanical, hydraulic and pneumatic devices are available for this purpose.

The following example is given as illustrative only of the present invention, without, however, limiting the invention to the specific details described therein:

*Example*

As described above, prior to introduction of the stack of thermoplastic sheets, elements 3, 4 and of the apparatus are first preheated in box 1 to the moulding or softening temperature of the plastic sheets and thereafter, the assembly portions 4 and 7 are taken out of the heating or insulating box 1. In place of the matrix arrangement illustrated in connection with matrix 4, it is also possible to use the counteracting tool arrangement of FIG. 6.

Between two foils of softener-free polyvinyl chloride, each having a thickness of 1.5 mm. and destined to serve as cover layers, a sheet of cellular thermoplastic synthetic material having a thickness of about 10 mm. is interposed. Such thermoplastic cellular material, for instance may be of the type known commercially as "AIREX," quality 01/18. This type of cellular sheet material, also consists of softener-free polyvinyl chloride. The faces of the cover foils which will come in contact with the interposed cellular sheet had been previously treated with a thermoplastic adhesive, for instance a mixed polymerizate of vinylchloride-vinylacetate type such as may be obtained commercially from Lonza A.G., Basel, Switzerland under the code number MP 375. The adhesive is applied in liquid form and is dried on the face of the respective foil 13 prior to contacting celluar sheet 12 with the thus treated faces. The adhesive thus will be in inactive condition and the three thermoplastic layers which now are superposed will not adhere to each other. The thus formed stack of superposed thermoplastic sheets is then cut to the desired size and is inserted between and gripped by frames 8 and 8a of the holding device 7, in the manner illustrated in FIG. 2 of the drawing. Thereby, an annular peripheral portion of the stack of superposed thermoplastic sheets will extend outwardly of the gripping frames 8 and 8a.

The distance between clamping jaws 9 and 9a is adjusted by means of spacing members 11 so that the stack of superposed thermoplastic sheets which initially had a total thickness of about 13 mm., will be compressed between frames 8 and 8a to a thickness of about 12.5 mm. Due to this very slight degree of compression, it is assured that during deep drawing of the sheets, the same will be capable of sliding lateral movement relative to each other in the direction towards the deep drawing tools.

The entire holding arrangement 7 with the stack of superposed thermoplastic sheets gripped therein, as well as matrix 4 or the counteracting tool of FIG. 6, are now inserted into box 1 in the manner described further above, cover 2 and tubular members 14 are put in place and nuts 6 and wrenches 6a are placed on lifting screws 5.

The actual deep drawing is then carried out in the manner described further above. Under the conditions of the present example, i.e. when the thermoplastic sheets consist of softener-free polyvinyl chloride, the moulding temperature is adjusted to 120° C.

Apart from the initial cutting of the thermoplastic sheets prior to insertion of the same into frame device 8–8a, and apart from cutting off the excess rim of the deep drawn finished product, the steps of the process are carried out in the sequence described below:

(1) Preheating of punch member 3 and matrix 4 or of the counteracting tool, as well as holding arrangement 7 to a temperature of 120° C. while these sub-assemblies are located in box 1.

(2) Withdrawing the preheated matrix 4 or the counteracting tool, as well as holding arrangements 7 from box 1 and gripping of the stack of superposed thermoplastic sheets by frames 8 and 8a of holding device 7; insertion of holding arrangement 7 with the gripped superposed thermoplastic sheets, and of matrix 4 or of the counteracting tool arrangement into box 1, the foregoing being carried out as quickly as possible in order to prevent unnecessary heat losses.

(3) Heating of the gripped foils 12 and the interposed cellular layer 13, i.e. of the gripped stack of thermoplastic sheets in box 1 to a temperature of 120° C. The length of time required for this heating step depends on the dimensions of the portion of the stack of thermoplastic sheets which is surrounded by gripping frames 8–8a.

(4) Deformation of the heated stack of thermoplastic sheets by deep drawing and pressing of the cover layers 12 against core layer 13. Matrix 4 or the counteracting tool will be moved towards punch member 3 at a speed which will depend on the thickness of the stack of thermoplastic sheets. Generally, matrix 4 will be moved towards punch member 3 at a speed of between 1 and 10 cm., preferably between 3 and 6 cm. per minute. During this deep drawing step, portions of the individual thermoplastic sheets which extend outwardly of gripping frames 8 and 8a or which are gripped by these frames will slide inwardly and supply the additional sheet material which is required for shaping the stack of thermoplastic sheets to its desired final configuration. Due to the relatively small gripping pressure which is exerted by frames 8 and 8a, the individual sheets will respond to relatively small degrees of tension exerted by the operation of the deep drawing tools and thus will slide inwardly to a sufficient degree to prevent any substantial stretching or reduction in the diameter of the sheet portions which are subjected to deep drawing.

(5) The deep drawing tools are now maintained in final position and the temperature is maintained at 120° C. for a period of about 15 to 20 minutes. At the end of this period, the thermoplastic adhesive has been sufficiently activated so that a firm bond between adjacent superposed thermoplastic sheets will be formed by subsequent cooling of the shaped body.

(6) The entire gripping device, i.e. punch member 3, matrix 4, holding arrangement 7 and of course the interposed shaped stack of thermoplastic sheets is now lifted from box 1.

(7) Punch member 3, matrix 4 and the shaped body therebetween are now cooled by spraying with water. After such cooling, the thus formed shaped multi-layer body will be below its deformation temperature and the adhesive between the individual thermoplastic layer will have hardened and firmly bonded the layers to each other.

(8) Finally, the deep drawing tools are separated from the shaped body formed therebetween and the shaped body is removed from holding device 7 by loosening frames 8 and 8a as described above.

The entire process as described above is carried out between about 75 and 80 minutes.

The thus produced shaped body has throughout a substantially even cross sectional thickness of between about 8 and 9 mm., due to the fact that the individual thermoplastic sheets were allowed to slide inwardly under the influence of tension exerted by the deep drawing process. If the individual thermoplastic sheets or the stack of thermoplastic sheets would have been gripped firmly between frames 8 and 8a so as to prevent any such sliding movement, then by following the process outlined above, the cross sectional thickness of different portions of the shaped body would vary between 4 and 10 mm.

All that remains to be done now is the trimming of the edges of the thus finished deep drawn multi-layer body.

Without further analysis, the foregoing will so fully reveal the gist of the present invention that others can by applying current knowledge readily adapt it for various applications without omitting features that, from the standpoint of prior art, fairly constitute essential characterisics of the generic or specific aspects of this invention and, therefore, such adaptations should and are intended to be comprehended within the meaning and range of equivalence of the following claims.

What is claimed as new and desired to be secured by Letters Patent is:

1. In a method of producing a curved shaped unitary body of predetermined configuration, the steps of forming a stack comprising at least two solid thermoplastic cover sheets and at least one cellular thermoplastic sheet interposed between said cover sheets, with layers of latently adhesive material respectively, interposed between adjacent thermoplastic sheets, said latently adhesive material being adapted to become actively adhesive at the molding temperature of said thermoplastic sheets; gripping said stack along an annular portion thereof but lightly, so as to hold said sheets of said stack together while permitting sliding movement of said sheets relative to each other under the influence of different lateral tension exerted on said annular portions of said sheets, respectively, so that due to said sliding movement of said gripped sheet portions stretching of the respective sheets will be even throughout the tensioned portions thereof and the same will be of even cross-sectional dimensions; and subjecting the portion of said stack surrounded by said gripped annular portion to deep drawing to said predetermined configuration at the molding temperature of said thermoplastic sheets, thereby activating said latently adhesive layer and exerting different tension on the gripped annular portions of said sheets, respectively, causing different lateral sliding movement of said annular portions of said sheets, respectively, inwardly toward the portion thereof which is subjected to deep drawing, thereby substantially preventing distortion of the cross sectional dimensions of said sheets during deep drawing of the same.

2. In a method of producing a curved shaped unitary body of predetermined configuration, the steps of forming a stack comprising at least two solid thermoplastic cover sheets and at least one cellular thermoplastic sheet interposed between said cover sheets, with a layer of latently adhesive material interposed between adjacent thermoplastic sheets, said latently adhesive material being adapted to become actively adhesive at the molding temperature of said thermoplastic sheets; gripping said stack along an annular portion thereof but lightly, so as to hold said sheets of said stack together without preventing sliding movement of said sheets relative to each other under the influence of different degrees of lateral tension exerted on said annular portions of said sheets, respectively; subjecting the portion of said stack surrounded by said gripped annular portion to deep drawing to said predetermined configuration at the molding temperature of said thermoplastic sheets, thereby activating said latently adhesive layer and exerting different degrees of tension on the gripped annular portions of said sheets, respectively, causing different lateral sliding movement of said annular portions of said sheets, respectively, inwardly toward the portion thereof which is subjected to deep drawing, said sliding movement being substantially commensurate to the degree of tension exerted on the annular portion of the respective sheet, thereby substantially preventing distortion of the cross sectional dimensions of said sheets during deep drawing of the same; and cooling the thus deep drawn sheets to below their molding temperature, whereby a unitary shaped body of said predetermined configuration will be formed.

3. In a method of producing a curved shaped unitary body of predetermined configuration, the steps of forming a stack comprising at least two solid thermoplastic cover sheets and at least one cellular thermoplastic sheet interposed between said cover sheets, with a layer of latently adhesive material interposed between adjacent thermoplastic sheets, said latently adhesive thermoplastic material being adapted to become actively adhesive at the molding temperature of said thermoplastic sheets; gripping said stack along an annular portion thereof but lightly, so as to hold said sheets of said stack together without preventing sliding movement of said sheets relative to each other under the influence of different lateral tension exerted on said annular portions of said sheets, respectively; and subjecting the portion of said stack surrounded by said gripped annular portion to deep drawing to said predetermined configuration at the molding temperature of said thermoplastic sheets, thereby activating said latently adhesive layer and exerting different tension on the gripped annular portions of said sheets, respectively, causing different lateral sliding movement of said annular portions of said sheets, respectively, inwardly toward the portion thereof which is subjected to deep drawing, thereby substantially preventing distortion of the cross sectional dimensions of said sheets during deep drawing of the same; and cooling the thus deep drawn sheets to below their molding temperature thereby also hardening said thermoplastic adhesive material, whereby a unitary shaped body of said predetermined configuration will be formed.

4. In a method of producing a curved shaped unitary body of predetermined configuration, the steps of forming a stack comprising at least two solid thermoplastic cover sheets and at least one cellular thermoplastic sheet interposed between said cover sheets, with a layer of latently adhesive material interposed between adjacent thermoplastic sheets, said latently adhesive material being adapted to become actively adhesive at the molding temperature of said thermoplastic sheets; gripping said stack along an annular portion thereof but lightly, so as to hold said sheets of said stack together without preventing sliding movement of said sheets relative to each other under the influence of different lateral tension exerted on said annular portions of said sheets, respectively; and subjecting the portion of said stack surrounded by said gripped annular portion to deep drawing to said predetermined configuration at the molding temperature of said thermoplastic sheets, thereby activating said latently adhesive layer and exerting different tension on the gripped annular portions of said sheets, respectively, causing different lateral sliding movement of said annular portions of said sheets, respectively, inwardly toward the portion thereof which is subjected to deep drawing, and said gripped annular portion having a width which exceeds the length of the path of the sliding lateral movement of the respective thermoplastic sheet, so that a portion of said stack will remain gripped during the entire deep drawing of the same, thereby substantially preventing distortion of the cross sectional dimensions of said sheets during deep drawing of the same.

5. In a method of producing a curved shaped unitary body of predetermined configuration, the steps of forming a stack comprising at least two solid thermoplastic cover sheets and at least one cellular thermoplastic sheet interposed between said cover sheets, with a layer of latently adhesive material interposed between adjacent thermoplastic sheets, said latently adhesive material being adapted to become actively adhesive at the molding temperature of said thermoplastic sheets; gripping said stack along an annular portion thereof but lightly, so as to hold said sheets of said stack together wthout preventing sliding movement of said sheets relative to each other under the influence of different lateral tension exerted on said annular portions of said sheets, respectively, said gripped annular portion being spaced from the peripheral portion of said stack; and subjecting the portion of said stack surrounded by said gripped annular portion to deep drawing to said predetermined configuration at the molding temperature of said thermoplastic sheets, thereby activating said latently adhesive layer and exerting different tension on the gripped annular portions of said sheets, respectively, causing different lateral sliding movement of said annular portions of said sheets, respectively, inwardly toward the portion thereof which is subjected to deep drawing and corresponding inward movement of the peripheral portion of said stack into the position initially maintained by said annular portion so that at all times during the deep drawing of said stack of sheets an annular portion thereof will be in said gripped position, said sliding movement being substantially commensurate to the degree of tension exerted on the annular portion of the respective sheet, thereby substantially preventing distortion of the cross sectional dimensions of said sheets during deep drawing of the same; and cooling the thus deep drawn sheets to below their molding temperature thereby also hardening said thermoplastic adhesive material, whereby a unitary shaped body of said predetermined configuration will be formed.

6. In a method of producing a curved shaped unitary body of predetermined configuration, the steps of forming a stack of comprising at least two solid thermoplastic cover sheets and at least one cellular thermoplastic sheet interposed between said cover sheets, with a layer of latently adhesive material interposed between adjacent thermoplastic sheets, said latently adhesive material being adapted to become actively adhesive at the molding temperature of said thermoplastic sheets; gripping said stack along an annular portion thereof but lightly, so as to reduce the thickness of the gripped annular portion by between about 2 and 10% and to hold said sheets of said stack together without preventing sliding movement of said sheets relative to each other under the influence of different degrees of lateral tension exerted on said annular portions of said sheets, respectively; and subjecting the portion of said stack surrounded by said gripped annular portion to deep drawing to said predetermined configuration at the molding temperature of said thermoplastic sheets, thereby activating said latently adhesive layer and exerting different degrees of tension on the gripped annular portions of said sheets, respectively, causing different lateral sliding movement of said annular portions of said sheets, respectively, inwardly toward the portion thereof which is subjected to deep drawing, said sliding movement being substantially commensurate to the degree of tension exerted on the annular portion of the respective sheet.

References Cited by the Examiner

UNITED STATES PATENTS

| | | | |
|---|---|---|---|
| 2,378,642 | 6/45 | Kopplin | 264—292 |
| 2,849,026 | 8/58 | Taplin | 264—322 |
| 3,003,576 | 10/61 | Dodge | 156—196 XR |

FOREIGN PATENTS 88,402  6/58  Netherlands.

ALEXANDER WYMAN, *Primary Examiner.*

EARL M. BERGERT, *Examiner.*